(12) United States Patent
Books et al.

(10) Patent No.: US 10,184,441 B2
(45) Date of Patent: Jan. 22, 2019

(54) ENGINE START/STOP FUNCTION MANAGEMENT

(71) Applicant: Cummins Inc., Columbus, IN (US)

(72) Inventors: Martin T. Books, Columbus, IN (US);
Erik L. Piper, Columbus, IN (US);
Brian R. Alderfer, Columbus, IN (US);
Jaideep Prasad, Columbus, IN (US);
John P. O'Brien, Grantham (GB)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/377,405

(22) Filed: Dec. 13, 2016

(65) Prior Publication Data

US 2017/0089314 A1 Mar. 30, 2017

Related U.S. Application Data

(63) Continuation of application No. PCT/US2014/045260, filed on Jul. 2, 2014.

(51) Int. Cl.
*F02N 11/08* (2006.01)
*B60W 20/13* (2016.01)
*F02N 11/04* (2006.01)

(52) U.S. Cl.
CPC .......... *F02N 11/084* (2013.01); *B60W 20/13* (2016.01); *F02N 11/0818* (2013.01); *F02N 11/04* (2013.01); *F02N 2200/022* (2013.01); *F02N 2200/023* (2013.01); *F02N 2200/061* (2013.01); *F02N 2200/0801* (2013.01); *F02N 2200/102* (2013.01); *F02N 2300/2011* (2013.01); *Y02T 10/48* (2013.01)

(58) Field of Classification Search
CPC .. F02N 11/084; F02N 2200/061; B60W 20/13
See application file for complete search history.

(56) References Cited

U.S. PATENT DOCUMENTS 5,072,703 A * 12/1991 Sutton ................. F02N 11/0803
123/179.4
6,492,741 B1 * 12/2002 Morimoto ............... B60L 11/12
180/65.1

(Continued)

OTHER PUBLICATIONS

International Search Report and Written Opinion, PCT Appln. No. PCT/US2014/045260, dated Nov. 5, 2014, 16 pgs.

*Primary Examiner* — Hieu T Vo
*Assistant Examiner* — Arnold Catsro
(74) *Attorney, Agent, or Firm* — Taft Stettinius & Hollister LLP

(57) ABSTRACT

A system and method for controlling automatic start/stop operations for an engine. While the engine is shutdown, operation of the engine may be automatically started upon expiration of a threshold time limit or in response to one or more adverse or deteriorated conditions of a power storage device, such as, for example, a state of health, state of function, or state of charge of the power storage device. After the engine has been automatically started, the ability of the controller to subsequently automatically stop the operation of the engine may be disabled until at least one secondary condition is satisfied. Upon satisfaction of the at least one secondary condition, the controller may again be enabled to at least automatically stop the operation of the engine.

18 Claims, 3 Drawing Sheets

(56) References Cited

U.S. PATENT DOCUMENTS

| | | | |
|---|---|---|---|
| 6,504,259 B1* | 1/2003 | Kuroda | B60K 6/46 |
| | | | 180/65.25 |
| 6,532,926 B1* | 3/2003 | Kuroda | B60H 1/00778 |
| | | | 123/179.4 |
| 7,036,477 B1 | 5/2006 | Thompson et al. | |
| 7,091,629 B2 | 8/2006 | Hawkins | |
| 7,146,959 B2 | 12/2006 | Thompson et al. | |
| 7,983,812 B2 | 7/2011 | Potter | |
| 8,457,859 B2 | 6/2013 | Drogosch et al. | |
| 8,473,114 B2 | 6/2013 | Bauerle et al. | |
| 2001/0013701 A1 | 8/2001 | Onoyama et al. | |
| 2003/0197385 A1* | 10/2003 | Onoyama | F02N 11/084 |
| | | | 290/40 R |
| 2004/0093127 A1* | 5/2004 | Onoyama | B60R 25/00 |
| | | | 701/1 |
| 2006/0021808 A1* | 2/2006 | McGee | B60K 6/445 |
| | | | 180/65.235 |
| 2006/0217228 A1* | 9/2006 | Devita | B60K 6/445 |
| | | | 477/3 |
| 2010/0100306 A1 | 4/2010 | Gamache et al. | |
| 2011/0320083 A1 | 12/2011 | Nishimura | |
| 2014/0075177 A1 | 3/2014 | Sugitachi | |
| 2015/0120104 A1* | 4/2015 | Stefanon | B60W 10/06 |
| | | | 701/22 |
| 2015/0361910 A1* | 12/2015 | Ko | F02N 11/0818 |
| | | | 477/107 |

* cited by examiner

ENGINE START/STOP FUNCTION MANAGEMENT

CROSS-REFERENCE TO RELATED APPLICATION

The present application is a continuation of International Application No. PCT/US2014/045260 filed on Jul. 2, 2014, which is incorporated herein by reference.

BACKGROUND

The present invention generally relates to engine start/stop controls. More particularly, embodiments of the present invention relate to controlling automatic start/stop operations based on the conditions of a power storage device.

Start/stop controls are often configured to utilize opportunities to stop an engine of a vehicle so as to at least attempt to reduce fuel consumption, and thus reduce fuel costs, while also mitigating emissions. However, while the engine is stopped, components of the vehicle, including components related to the operation of the engine and auxiliary devices, may continue to draw power from the engine battery. Such continued electric loads on the engine battery may adversely impact the state of function (SOF) of the battery, such as, for example, the ability of the battery to provide sufficient power for engine cranking. Additionally, as the engine battery continues to be subjected to electrical loads while the engine is stopped, the state or level of charge (SOC) of the engine battery may be reduced. Additionally, over time, as the engine battery at least continues to be used, the ability of the engine battery to store and deliver electrical energy may be reduced, thereby resulting in the degradation of the state of health (SOH) of the engine battery. Thus, at least the potential adverse impact start/stop operations may have on the SOF, SOC, and/or SOH of the engine battery may impair the ability of the engine battery to subsequently provide electrical power needed to restart and operate the engine.

BRIEF SUMMARY

An aspect of the present invention is a method for controlling, by a controller of a vehicle system that includes an engine and a power storage device, automatic starting and automatic stopping of the operation of the engine. The method includes determining, by the controller, the occurrence of at least one primary condition, the at least one primary condition related to a condition of the power storage device. Based on the occurrence of the at least one primary condition, the controller may be operated to automatically start the operation of the engine. After the engine has been automatically started, the ability of the controller to automatically stop the operation of the engine may be disabled until at least one secondary condition is satisfied. Upon satisfaction of the at least one secondary condition, the controller may again be enabled to at least automatically stop the operation of the engine.

Another aspect of the present invention is a method for controlling, by a controller of a vehicle system that includes an internal combustion engine and a power storage device, automatic starting and automatic stopping of the operation of the internal combustion engine. The method includes determining, by the controller and while the internal combustion engine is stopped, the satisfaction of a primary condition that relates to one or more conditions of the power storage device. In response to the satisfaction of the primary condition, the operation of the internal combustion engine is automatically started. Further, in response to automatically starting the operation of the internal combustion engine, the ability of the controller to issue commands that cause the automatic stopping of the internal combustion engine is disabled. Additionally, while the automatically started internal combustion engine is operating, the controller may determine whether one or more secondary conditions have been satisfied. If the controller determines the one or more secondary conditions are satisfied, the controller may again be enabled to issue commands that cause the automatic stopping of the internal combustion engine.

Another aspect of the present invention is a method for controlling, by a controller of a vehicle system that includes an internal combustion engine and a power storage device, automatic starting and automatic stopping of the operation of the internal combustion engine. The method includes automatically shutting down the operation of an engine based on the occurrence of one or more conditions. Upon the automatic shutdown of the operations of the engine, a timer may be initiated. The controller monitors the timer to determine whether a threshold time limit has expired, the threshold time limit corresponding to a predicted amount of time that the power source device is to supply a threshold load of electrical power. Further, upon expiration of the threshold time limit, operation of the engine may be automatically started.

Additionally, another aspect of the present invention is s system for controlling automatic start/stop operations of an engine based at least in part on the conditions of a power storage device. The system includes an engine start/stop control module that is adapted to control the automatic starting and automatic stopping of the operations of the engine. The engine start/stop control module includes a constraints module that is adapted to disable the engine start/stop control module from being able to automatically stop the operation of the engine following a directly preceding automatic start of the operation of the engine that was in response to one or more adverse conditions of the power storage device. The constraints module is further adapted to subsequently re-enable the ability of the engine start/stop control module to automatically stop the operation of the engine after determining that one or more secondary conditions are satisfied. The engine start/stop control module also includes a timer module that is configured to provide information relating to a time period during which the engine start/stop control module has been disabled following the automatic start of the engine. The system further includes a power storage device management system that is configured to provide information relating to the one or more adverse conditions of the power storage device to the constraints module.

Other aspects of the present invention will become apparent by consideration of the detailed description and accompanying drawings.

Figure 1:
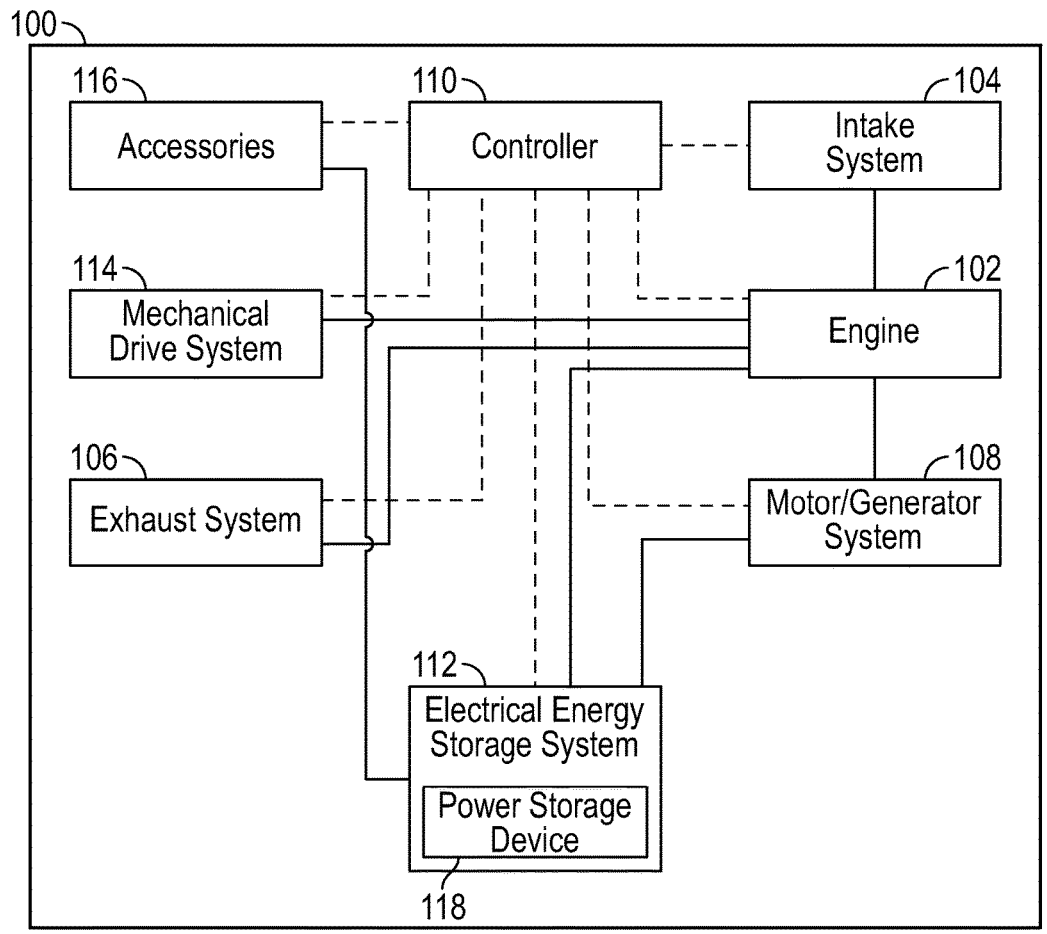
FIG. 1 is a schematic representation of a vehicle system.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

FIG. 1 is a schematic representation of a vehicle system 100. As shown, the vehicle system 100 may include an engine 102, an intake system 104, an exhaust system 106, a motor/generator system 108, a controller 110, an electrical energy storage system 112, a mechanical drive system 114, and/or a variety of accessories 116, among other components. It shall be appreciated that the illustrated configuration and components of the vehicle system 100 are but one example, and that the disclosure contemplates that a variety of different vehicle systems 100 and the associated components may be utilized.

A variety of engines may be used, such as, for example, internal combustion engines. Further, the engine 102 may be fueled by a liquid fuel, such as, for example, diesel fuel or gasoline, and/or by a gaseous fuel, such as natural gas, bio-gas, methane, propane, ethanol, producer gas, field gas, liquefied natural gas, compressed natural gas, or landfill gas. However, other types of liquid and gaseous fuels are not precluded. Operation of the engine 102 may cause the rotational movement of a crankshaft that is operably connected to a drive train that is used in the delivery of power to wheels of the associated vehicle.

The intake system 104 may be configured to deliver an air flow, such as, for example, charged air flow to an intake manifold of the engine 102. According to certain embodiments, the intake system 104 may also be used in the delivery of fuel to the engine 102, such as, for example, the gaseous fuel. The exhaust system 106 may be configured for the delivery of an exhaust stream that is generated at least in part by the operation of the engine 102 to a tailpipe for subsequent release from the vehicle system 100. According to certain embodiments, the exhaust system 106 that is configured for the treatment of the exhaust stream, such as, for example, for the removal or reduction of nitrogen oxide ($NO_x$) and particulates in the exhaust stream, and/or the recirculation of the exhaust stream to the intake system 104 or intake manifold of the engine 102.

According to the illustrated embodiment, the electrical energy storage system 112 may include a power storage device 118 that provides stored electrical power to the vehicle system 100, including accessories 116 that are part of, or operably connected to, the vehicle system 100. A variety of different types of power storage devices 118 may be used, including, for example, one or more electrochemical batteries, super-capacitors, or ultra-capacitors. Additionally, the electrical energy storage system 112 may be operably connected to the motor/generator system 108. In the illustrated embodiment, the motor/generator system 108 may be configured as an electrical motor/generator system. The motor/generator system 108 may operate as a motor that is powered by electricity from the power storage device 118, or as an electric power generator that captures electric energy.

The controller 110, which may be configured to control various operational aspects of vehicle system 100, may be implemented in a number of ways. Further, the controller 110 may execute operating logic that defines various control, management, and/or regulation functions. The operating logic may be in the form of one or more microcontroller or microprocessor routines stored in a non-transitory memory, dedicated hardware, such as a hardwired state machine, analog calculating machine, various types of programming instructions, and/or other forms as would occur to those skilled in the art.

Additionally, the controller 110 may be provided as a single component, or a collection of operatively coupled components, and may comprise digital circuitry, analog circuitry, or a hybrid combination of both of these types. When of a multi-component form, the controller 110 may have one or more components remotely located relative to the others in a distributed arrangement. The controller 110 can include multiple processing units arranged to operate independently, in a pipeline processing arrangement, in a parallel processing arrangement, or the like. In one embodiment, the controller 110 includes several programmable microprocessing units of a solid-state, integrated circuit type that are distributed throughout the vehicle system 100 that each include one or more processing units and non-transitory memory. For the depicted embodiment, the controller 110 includes a computer network interface to facilitate communications using standard Controller Area Network (CAN) communications or the like among various system control units. It should be appreciated that the depicted modules or other organizational units of the controller 110 refer to certain operating logic performing indicated operations that may each be implemented in a physically separate controller of the controller 110 and/or may be virtually implemented in the same controller.

The description herein including modules and/or organizational units emphasizes the structural independence of the aspects of the controller 110, and illustrates one grouping of operations and responsibilities of the controller 110. Other groupings that execute similar overall operations are understood within the scope of the present application. Modules and/or organizational units may be implemented in hardware and/or as computer instructions on a non-transient computer readable storage medium, and may be distributed across various hardware or computer based components.

Example and non-limiting implementation elements of modules and/or organizational units of the controller 110 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The controller 110 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

As shown in FIG. 1, the controller 110 is operably connected to a variety of components of the vehicle system 100, including, for example, the electrical energy storage system 112, the intake system 104, the exhaust system 106, the motor/generator system 108, the mechanical drive system 114, and/or various accessories 116. Such connections may allow for the communication of information, data, and/or commands between the controller 110 and components of the vehicle system 100 that are used in connection the operation and performance of the vehicle system 100.

Figure 2:
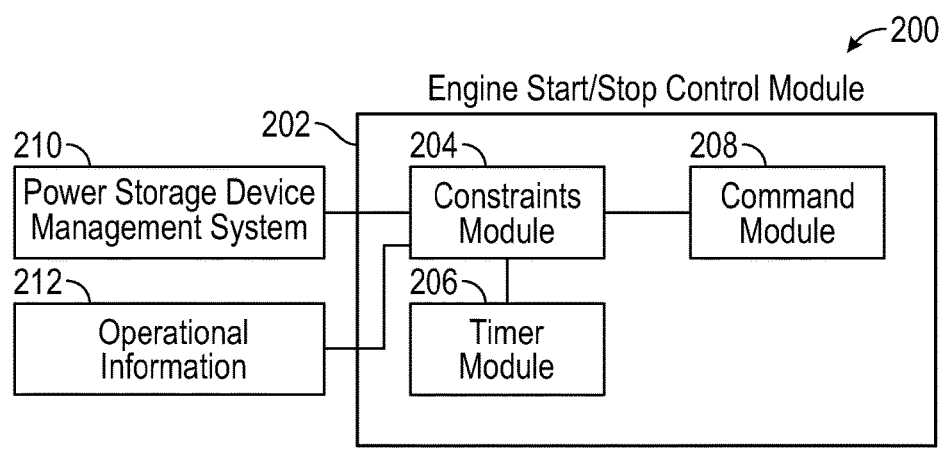
FIG. 2 illustrates a block diagram of exemplary control system that can be implemented by an engine start/stop control module.

FIG. 2 illustrates a block diagram of exemplary control system 200 that can be implemented by an engine start/stop control module 202 of the controller 110. In the illustrated embodiment, the engine start/stop control module 202 may be adapted to control engine 102 start events and engine stop events based on a variety of different conditions and/or constraints, including, for example, constraints that indicate whether the engine start/stop control module 202 is enabled, allowed, prohibited, or otherwise disabled from initiating a stop or start event based on past, current, and/or predicted conditions or events. A number of forms or implementations of the engine start/stop control module 202 are contemplated. The engine start/stop control module 202 may be adapted to perform a number of operations and tasks, including, for example, determining whether actual or predicted conditions of the vehicle system 100, including, for example, the engine 102, accessories 116, and/or electrical energy storage system 112, meet certain criteria for the initiation, suspension, and/or termination of automatic engine start or automatic engine stop commands from the engine start/stop control module 202.

For at least purposes of illustration, the engine start/stop control module 202 may include at least a constraints module 204, a timer module 206, and an command module 208. According to such embodiments, the constraints module 204 may be configured to determine whether conditions or other criteria exists or has, or has not, been satisfied in determining whether the command module 208 is to be allowed, or not allowed, to provide engine start/stop commands relating to at least initiating automatic starting and/or automatic stopping of the engine 102.

The start/stop control module 202 may receive information or data from a variety of components of the vehicle system 100. For example, according to the illustrated embodiment, the start/stop control module 202, and in particular the constraints module 204, may receive information from a power storage device management system 210 that provides information regarding the status or condition of the power storage device 118. For example, according to certain embodiments in which the power storage device 118 is an engine battery or a pack of engine batteries, the power storage device management system 210 may provide information to the start/stop control module 202 that indicates the measured or predicted voltage, temperature, or levels of current entering or exiting the engine battery(ies). Further, according to certain embodiments, the power storage device management system 210 may be configured to determine, based on one or more sensed or predicted conditions of the power storage device 118, the state of function (SOF), state of health (SOH), and/or state of charge (SOC) of the engine battery(ies). Thus, according to certain embodiments, the power storage device management system 210 may provide the start/stop control module 202 the SOF, SOH, and/or SOC of the power storage device 118.

The start/stop control module 202 may also receive actual or virtual operational information from an operations module 212 that reflects various operations or conditions of the vehicle system 100. For example, according to certain embodiments, the operations module 212 may provide measured, sensed, or predicted information relating to engine speed, vehicle speed, braking events, engine temperature, operation of the motor/generator system 108, and/or exhaust gas temperature, among other information. Further, according to certain embodiments, the operations module 212 may provide an indication of the electrical load demand, actual or predicted, of components of the vehicle system 100, and moreover, the electrical load that is, or will be, placed on the power storage device 118.

The timer module 206 may include a real-time timer, counter, and/or summation operation, among other types of information or logic. According to certain embodiments, the timer module 206 may be a continuous timer or counter, and/or may initiate a timer or counter operation in response to the occurrence of one or more conditions and/or commands from the controller 110, engine start/stop control module 202, and/or the constraints module 204.

According to the illustrated embodiment, the constraints module 204 is configured to determine whether conditions or criteria are satisfied for the command module 208 to provide commands for the automatic starting or automatic stopping of the engine 102. Moreover, the constraints module 204 may contain, or otherwise have access to, the conditions or criteria needed to be satisfied in order for the command module 208 to be enabled to provide commands that result in the automatic starting or automatic stopping of the engine 102. Thus, according to certain embodiments, the constraints module 204 may suspend and/or disable the ability of the command module 208, and thus the engine start/stop control module 202, to automatically start and/or automatically stop the engine 102.

According to illustrated embodiments, the determination of whether and/or when to initiate an automatic start or stop of the engine 102 may be based on actual or predicted conditions of the power storage device 118. For example, according to certain embodiments, a threshold load may be determined that corresponds to a predicted amount of power that is to be supplied by the power storage device 118 during a duration of time following an automatic shutdown of the engine 102. The threshold load may be determined in a variety of different manners. For example, according to certain embodiments, the threshold load is a predicted amount of electrical power that is to be supplied by the power storage device 118 under certain conditions after the engine 102 has been automatically shutdown and before the engine is anticipated to be automatically restarted. Such conditions may include, for example, the maximum amount of power that the power storage device 118 may be expected to provide while the engine has been, and remains, automatically shutdown. According to other embodiments, the threshold load may be an amount of electrical power that may be supplied from the power storage device 118 during a shutdown period while still allowing the power storage device 118 to retain a sufficient amount of electrical power to at least assist in the restart, whether automatic or manual, of the engine 102.

According to certain embodiments, the controller 110, including, for example, the engine start/stop module 202, may determine a threshold time limit that corresponds to a predicted amount of time following automatic shutdown of the engine 102 before the threshold load is expected to be reached. More specifically, the threshold time limit may be the amount of time during automatic shutdown that is predicted to lapse before the power storage device 118 supplies the threshold load of electrical power.

Figure 3:
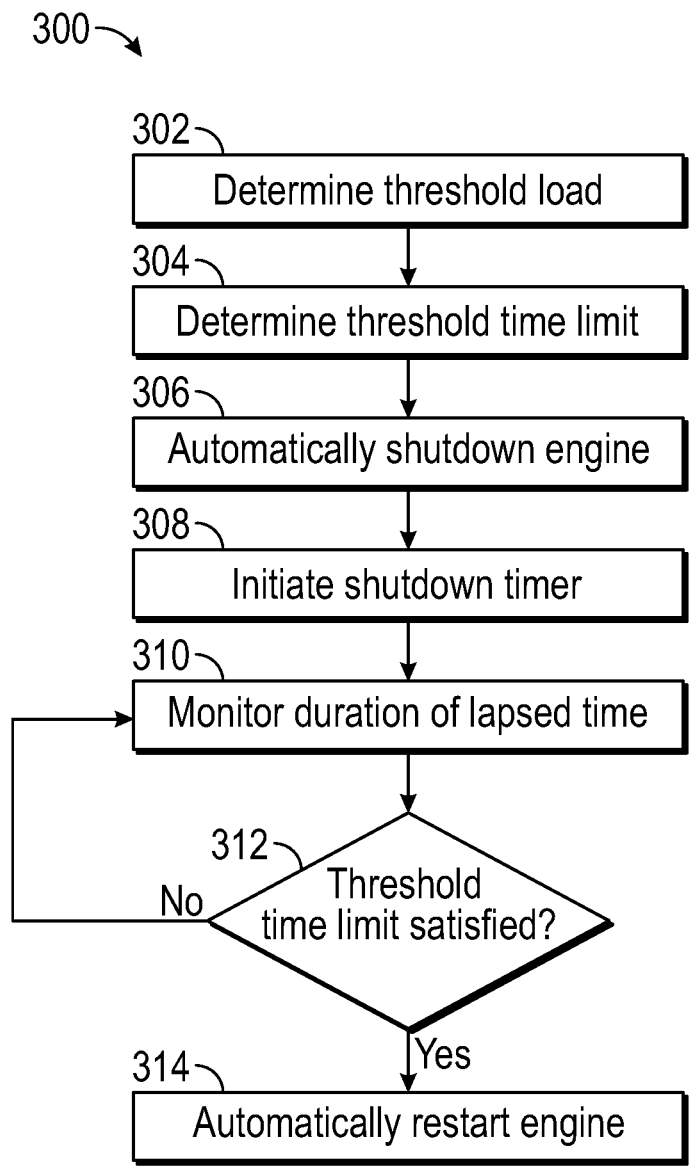
FIG. 3 illustrates a schematic flow diagram of an exemplary process for automatically starting an engine using engine start/stop controls based on satisfaction of a threshold time limit.

FIG. 3 illustrates a schematic flow diagram of an exemplary process 300 for automatically starting an engine 102 using engine start/stop controls based on satisfaction of a threshold time limit. Steps illustrated are understood to be exemplary only, and steps may be combined or divided, and added or removed, as well as re-ordered in whole or in part. At step 302, the controller 110 may determine or otherwise be provided with the threshold load, such as, for example, during calibration of the vehicle system 100. Again, as previously stated, the threshold load may be determined in a variety of different manners, and may be determined based on a variety of different factors or conditions. Further, the threshold load may vary, such as, for example, based on changes in the current state of function (SOF), state of health (SOH), state of charge (SOC) of the power storage device 118, and/or anticipated electrical loads on the power storage device 118. At step 304, the threshold time limit may be determined. Again, according to certain embodiments, the threshold time limit may be based on a predicted duration of time during engine 102 shutdown that will lapse before the threshold load is attained. At step 306, in response to a command from the command module 208, the engine 102 may be automatically shutdown. For example, according to certain embodiments, information regarding the operating conditions or status of the engine 102 may indicate to the constraints module 204 that conditions or criteria are satisfied for automatic shutdown of the engine 102.

At step 308, the timer module 206 relating to the present shutdown may be initiated or otherwise begin an indication of the start of the automatic shutdown of the engine 102. For example, according to certain embodiments, upon shutdown of the engine 102, the constraints module 204 may obtain or initiate a time indicator from/by the timer module 206 that provides an indication as to when the automatic shutdown of the engine 102 occurred. Alternatively, upon automatic shutdown of the engine 102, the timer module 206 may initiate a timer or counter that is indicative of the duration of the shutdown. At step 310, the constraints module 204 may monitor the duration of time that has lapsed since the shutdown was initiated, such as, for example, by obtaining information from the time module 206. At step 312, the constraints module 204 may determine whether the threshold time limit has been satisfied. For example, the constraints module 204 may receive information from the timer module 206 that indicates, or is used to determine that, how much time has lapsed since the shutdown of the engine 102, or which otherwise indicates that the threshold time limit has, or has not, been satisfied. If the threshold time limit has not been satisfied, then the constraints module 204 may continue to monitor the duration of time that has lapsed at step 310. If, however, the threshold time limit has been satisfied, then at step 314 the engine start/stop control module 202 may provide commands for the automatic start of the engine 102.

The constraints module 204 may also be configured to prohibit the engine start/stop control module 202 from stopping the engine 102 following an automatic starting of the engine 102 that was initiated because of certain conditions related to the power storage device 118 until certain criteria has/have been satisfied. More specifically, as previously discussed, following an automatic shutdown of the engine 102, the engine 102 continues to provide electrical power to satisfy electrical loads of the vehicle system 100. The continued supply of electrical power from the power storage device 118 may deplete or otherwise adversely impact the condition of the power supply device 118. Therefore, according to certain embodiments, when the power storage device 118 reaches certain conditions, also referred to as primary conditions, the engine start/stop control module 202 may provide commands to automatically start the engine 102. Further, according to certain embodiments, the constraints module 204 may disable, prohibit, or otherwise suspend the engine start/stop control module 202 from being able to subsequently automatically stop the engine 102 until certain conditions are satisfied.

Figure 4:
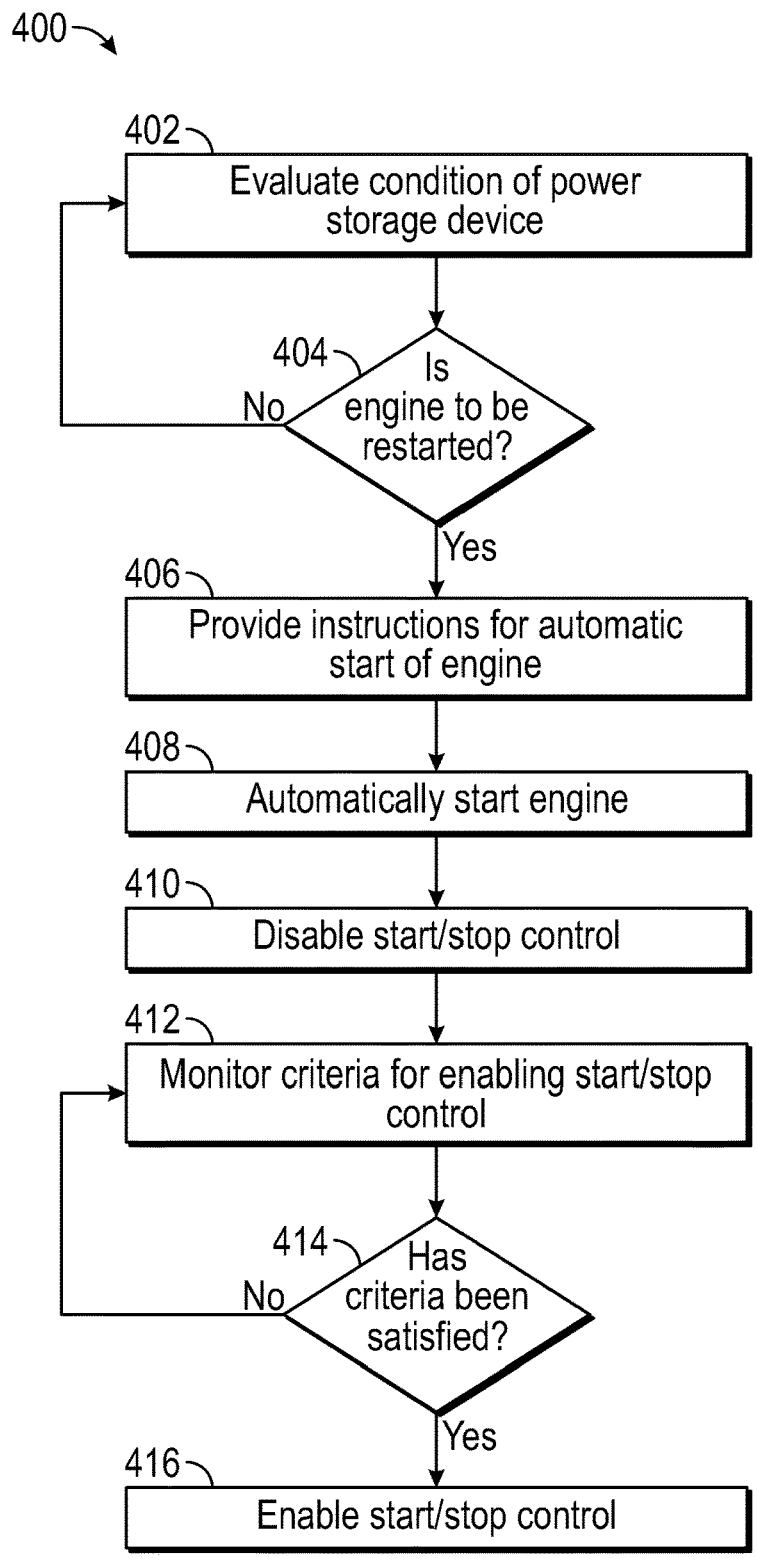
FIG. 4 illustrates a schematic flow diagram of an exemplary process for controlling the automatic stopping of an engine following an automatic start of the engine that was related to one or more conditions of the power supply device.

For example, FIG. 4 illustrates a schematic flow diagram of an exemplary process 400 for controlling the automatic stopping of an engine 102 following an automatic start of the engine 102 that was related to one or more conditions of the power storage device 118. At step 402, with the engine 102 shutdown based on a command(s) from the engine start/stop control module 202, the constraints module 204 may evaluate information regarding the condition of the power storage device 118. For example, according to certain embodiments, the power storage device management system 210 may evaluate or determine the state of function (SOF), state of health (SOH), state of charge (SOC), or other information regarding the condition of the power storage device 118, and may supply that information for evaluation by the constraints module 204.

At step 404, the constraints module 204 may determine whether the information provided at step 402 indicates that the engine 102 is to be, or is not to be, automatically restarted. For example, the information provided at step 402 may indicate whether the power storage device 118 has experienced an adverse power storage device event, such as, for example, a deterioration in the state of function (SOF), state of health (SOH), and/or state of charge (SOC), among other conditions of the power storage device 118, to a level(s) or condition that may require automatic starting of the engine 102. If the constraints module 204 determines that such primary conditions have not occurred, or are not anticipated to occur, such as, for example, the information provided at step 402 indicates that power storage device 118 has sufficient electrical power to continue satisfying electrical loads of the vehicle system 100 and sufficient power to restart of the engine 102, then the constraints module 204 may continue receiving and/or monitoring information regarding the condition of the power storage device 118. If, however, at step 404 the constraints module 204 determines that primary conditions have been satisfied, or will be satisfied, such as, for example, the occurrence of an adverse power storage device event in which the condition of the power storage device 118 is below or approaching certain levels or thresholds that may indicate that the continued supply of electrical power from the power storage device 118 may potentially hinder the ability of the power storage device 118 to at least assist with starting the engine 102, then at step 406 the command module 208 may provide a command instructing that the engine 102 be automatically started. The engine 102 may then be automatically started at step 408.

At step 410, the constraints module 204 may disable, suspend, or otherwise prohibit the command module 208, and thus the engine start/stop control module 202, from being able to provide commands that cause the subsequent automatic stopping of the engine 102. Moreover, the ability of the engine 102 to be automatically stopped through use of a start/stop command from the engine start/stop control module 202 may be disabled or suspended until one or more secondary conditions are satisfied, which may be monitored at step 412. A variety of different criteria may be utilized and/or monitored for the secondary conditions. For example, as the automatic start of the engine 102 at step 408 may have been based, at least in part, on deterioration in the condition(s) of the power storage device 118, secondary conditions needed to be satisfied to enable the engine start/stop control module 202 to subsequently automatically stop the engine 102 may be based on a predicted conditions or events that relate to the condition of the power storage device 118 improving since the engine 102 was automatically started at step 408.

For example, according to certain embodiments, the secondary conditions may relate, at least in part, to completion of a key cycle. Thus, after the engine 102 was automatically started due to a deterioration in one or more characteristics of the power storage device 118, the ability of the engine start/stop control module 202 to subsequently shutdown the engine 102 may be disabled or otherwise prevented until at least the next key cycle. More specifically, following the automatic restart of the engine 102 due to the occurrence of a primary condition, the ability of the engine start/stop control module 202 to subsequently shutdown the engine 102 may be disabled until the engine 102 is manually shutdown and subsequently manually restarted by the action of a user/operator. For example, according to certain embodiments, a key-cycle may require that the engine 102 be shut off at least once by an ignition key being turned to a key off, and the ignition key be subsequently turned to a key on position to at least once to at least start, if not run, the engine 102. Thus, according to certain embodiments, step 412 may monitor at least events relating to a key cycle.

Additionally, according to certain embodiments, the type of secondary conditions, including non-timer based secondary conditions, or the criteria for those secondary conditions, that is/are to be satisfied before the engine start/stop control module 202 is again enabled to initiate automatic shutdown of the engine 102 may be based on the type of underlying event that triggered the automatic restart of the engine 102. For example, according to certain embodiments, the secondary conditions, or criteria for those secondary conditions, following an automatic restart that was related to a state of charge (SOC) condition of the power storage device 118 may be different than when the automatic start was related to the state of health (SOH) of the power storage device 118. Further, for example, the engine speed that may need to be attained for satisfaction of the secondary criteria 102 following an automatic restart related to a state of charge (SOC) condition may be different than the engine speed that is to be attained when the automatic restart was related to the state of health (SOH) of the power storage device 118. Additionally, the criteria for the secondary consideration may vary for a particular type of adverse power supply event, such as, for example, the engine speed needed to be satisfied varying based on the degree or frequency of the state of charge (SOC) condition(s) that lead to the automatic start of the engine 102. Further, according to other embodiments, certain secondary conditions may need to be satisfied following some, but not all, types of adverse power supply device events. For example, a key cycle may need to be completed following an automatic restart that was related to a state of charge (SOC) condition, but may not need to be satisfied when the adverse power supply event was related to a state of health (SOH) condition.

Additionally, according to certain embodiments, the secondary conditions needed to be satisfied before the engine start/stop control module 202 is again enabled to initiate automatic shutdown of the engine 102 may be generally based on the expiration of a particular period of time, also referred to as a timer event. For example, upon the automatic start of the engine 102 at step 408, the timer module 206 may track the duration of time that has lapsed since the automatic start of the engine 102. According to certain embodiments, the timer event may take a variety of different forms, such as, for example, being based on real time and/or an ascending or descending counter or timer, among other forms of time measurement or evaluation. Further, according to certain embodiments, the timer module 206 may indicate the completion of the timer event, such as, for example, the completion of the predetermined period of time following the automatic start of the engine 102 at step 408. Alternatively, the timer module 206 may provide information to the constraints module 204 that the constraints module 204 uses in connection with determining when the timer event has expired or otherwise been satisfied. Thus, according to certain embodiments, step 412 may monitor whether the timer event has or has not been completed.

The actual or predicted duration of the timer event may be based on a number of different criteria. For example, according to certain embodiments, the duration of the timer event may be at least partially based on the type of primary condition(s), including, the type of adverse power storage device event, the level of deterioration of the power storage device 118, current or expected operating conditions or characteristics of the vehicle system 100, and the surrounding environment, such as the ambient temperature. For example, according to certain embodiments, the duration of the timer event is based on the amount of time that the power storage device 118 is predicted to need to recover from the adverse power supply device event, such as, for example, the amount of time that the power storage device 118 is expected to need to recharge to a particular level or degree. Further, the duration of the timer event may be different for different types of adverse power supply device events. For example, the duration of a timer event relating to an adverse event for the state of function (SOF) may be different than for an adverse event related to the state of health (SOH) or the state of charge (SOC) of the power source device 118. Further, for example, adverse power storage device events of the same type may have different timer event durations. For example, the duration of the timer event following an adverse power storage device event relating to a state of charge (SOC) condition may be different than the duration of the timer event for another adverse power storage device event that relates to a subsequent state of charge (SOC) condition. Such differences in the duration of the timer events may be based on a number of criteria, including, for example, differences in state of health (SOH), state of function (SOF), engine speeds and/or ambient temperatures, among other conditions or criteria.

According to certain embodiments, the timer event may not be triggered until certain conditions for the vehicle system 100 or power storage device 118 are attained and/or maintained. For example, according to certain embodiments, the timer event may begin when, following automatic start of the engine 102, one or more other secondary conditions are satisfied. Further, according to other embodiments, the condition(s) which triggered the start of the timer event may need to be maintained or exceeded for the duration of the timer event before the engine start/stop control module 202 may again be enabled to automatically stop the engine 102.

For example, according to certain embodiments, the power storage device 118 may need to maintain or exceed a minimum degree of recharge throughout the timer event before the engine start/stop control module 202 may be enabled to automatically stop the engine 102. According to other embodiments, the speed of the engine 102 and/or speed of the associated vehicle may need to attain a particular level, such as for example, 5 miles per hour, to trigger the start of the timer event, as well as maintain or exceed 5 miles per hour throughout the duration of the timer event, which may be monitored at step 412, before the engine start/stop control module 202 may be enabled to automatically stop the engine 102.

While the foregoing provides some examples of the criteria that may need to be satisfied before the engine start/stop control module 202 may be enabled to automatically stop the engine 102, according to certain embodiments, a variety of other secondary conditions, including conditions that may not be related to the condition of the power storage device 118, may need to be satisfied before the engine start/stop control module 202 may be enabled to automatically stop the engine 102. For example, according to certain embodiments, the secondary conditions may be at least in part based satisfaction of particular operations module 212, such as, for example, determining whether the associated vehicle has traveled a particular distance, whether the associated vehicle has come to a stop after moving, detection of the brake being pressed, or the absence of acceleration pedal input, among other criteria.

At step 414, the constraints module 204 may evaluate whether the conditions or criteria needed to be satisfied before engine start/stop control module 202 may be enabled to automatically stop the engine 102 have been satisfied. If the conditions or criteria have not been satisfied, then the constraints module 204 may continue monitoring the conditions or criteria. However, if the conditions or criteria have been satisfied, then at step 416, the command module 208 may be enabled to at least initiate the automatic stopping of the engine 102.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for controlling, by a controller of a vehicle system that includes an engine and a power storage device, automatic starting and automatic stopping of the operation of the engine, the method comprising:
   determining, by the controller and while the engine is stopped, the occurrence of at least one primary condition, the at least one primary condition related to a condition of the power storage device;
   based on the occurrence of the at least one primary condition, operating the controller to automatically start the operation of the engine;
   after the engine has been automatically started, suspending the ability of the controller to automatically stop the operation of the engine until at least one secondary condition is satisfied; and
   upon satisfaction of the at least one secondary condition, re-enabling the ability of the controller to at least automatically stop the operation of the engine.

2. The method of claim 1, wherein the at least one primary condition is at least one of the following: a state of health, a state of function, and/or a state of charge of the power storage device.

3. The method of claim 2, wherein the at least one secondary condition includes at least one of the following: a key cycle, a brake event, or an absence of an accelerator pedal input.

4. The method of claim 2, wherein the at least one secondary condition is the expiration of a timer event.

5. The method of claim 2, wherein the at least one secondary condition includes a power storage device condition being maintained for the duration of a timer event.

6. The method of claim 5, wherein the power storage device condition is at least one of the following: a state of health, a state of function, and/or a state of charge of the primary storage device.

7. The method of claim 2, wherein the at least one secondary condition needs to be maintained or exceeded for the duration of a timer event before the at least one secondary condition is satisfied.

8. The method of claim 7, wherein the at least one secondary condition is at least one of the following: an engine speed or a vehicle speed.

9. A method for controlling, by a controller of a vehicle system that includes an internal combustion engine and a power storage device, automatic starting and automatic stopping of the operation of the internal combustion engine, the method comprising:
   determining, by the controller and while the internal combustion engine is stopped, the satisfaction of a primary condition relating to one or more conditions of the power storage device;
   automatically starting, in response to the satisfaction of the primary condition, the operation of the internal combustion engine;
   suspending, in response to automatically starting the operation of the internal combustion engine, the ability of the controller to issue commands that cause the automatic stopping of the internal combustion engine;
   determining, by the controller and while the automatically started internal combustion engine is operating, whether one or more secondary conditions have been satisfied; and
   enabling, if the controller determines the one or more secondary conditions are satisfied, the ability of the controller to issue commands that cause the automatic stopping of the internal combustion engine.

10. The method of claim 9, wherein the step of determining by the controller whether the one or more secondary conditions have been satisfied includes:
   initiating a timer event; and
   determining whether the one or more secondary conditions were satisfied during the duration of the timer event.

11. The method of claim 10, wherein the step of initiating the timer event occurs when a threshold limit for the one or more secondary conditions is attained.

12. The method of claim 9, wherein the primary condition is at least one of the following: a state of health, a state of function, and/or a state of charge of the primary storage device.

13. The method of claim 12, wherein the one or more secondary conditions includes at least one of the following: a key cycle, a condition of the primary storage device, an engine speed, a vehicle speed, a brake event, and/or an absence of an acceleration pedal input.

14. The method of claim 13, wherein the primary condition includes at least two primary conditions, and wherein a criteria for at least one of the at least two primary conditions is different than a criteria for another of the least two primary conditions.

15. A system for controlling automatic start/stop operations of an engine based at least in part on the conditions of a power storage device, the system comprising:
   an engine start/stop control module adapted to control the automatic starting and automatic stopping of the operations of the engine, the engine start/stop control module including,
      a constraints module adapted to suspend the engine start/stop control module from being able to automatically stop the operation of the engine following a directly preceding automatic start of the operation of the engine that was in response to one or more adverse conditions of the power storage device, the constraints module further adapted to subsequently re-enable the ability of the engine start/stop control module to automatically stop the operation of the engine after determining that one or more secondary conditions are satisfied, and
      a timer module configured to provide information relating to a time period during which the engine start/stop control module has been disabled following the automatic start of the engine; and
   a power storage device management system configured to provide information relating to the one or more adverse conditions of the power storage device to the constraints module.

16. The system of claim 15, wherein the information provided by the power storage device management system relating to the one or more adverse conditions of the power storage device includes at least one of the following: a state of health, a state of function, and/or a state of charge of the primary storage device.

17. The system of claim 16, wherein the system further includes an operations module configured to provide information to the constraints module indicative of at least one of the one or more secondary conditions.

18. The system of claim 17, wherein the information provided by the operations module to the constraints module indicative of at least one of the one or more secondary conditions includes at least one of the following: a key cycle, an engine speed, a vehicle speed, a brake event, and/or an absence of an acceleration pedal input.

* * * * *